United States Patent
Klusemann et al.

(10) Patent No.: US 7,341,319 B2
(45) Date of Patent: Mar. 11, 2008

(54) DEVICE AND METHOD FOR OPERATING A MOTOR-VEHICLE PARKING BRAKE

(75) Inventors: Rainer Klusemann, Frankfurt am Main (DE); Axel Büse, Frankfurt am Main (DE); Karel Statsny, Frankfurt am Main (DE); Mirco Hinn, Frankfurt am Main (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 10/553,087

(22) PCT Filed: Apr. 7, 2004

(86) PCT No.: PCT/EP2004/050471

§ 371 (c)(1),
(2), (4) Date: Oct. 11, 2005

(87) PCT Pub. No.: WO2004/089711

PCT Pub. Date: Oct. 21, 2004

(65) Prior Publication Data

US 2006/0225972 A1    Oct. 12, 2006

(30) Foreign Application Priority Data

Apr. 8, 2003    (DE) ................ 103 15 970
Mar. 29, 2004    (DE) ............ 10 2004 015 710

(51) Int. Cl.
*B60T 8/32*    (2006.01)
(52) U.S. Cl. ...................................... 303/20

(58) Field of Classification Search ............... 188/2 D, 188/156, 158, 265; 192/219.4, 219.6; 303/15, 303/20
See application file for complete search history.

(56) References Cited

U.S. PATENT DOCUMENTS

| | | | |
|---|---|---|---|
| 5,922,038 A | 7/1999 | Horiuchi et al. | |
| 6,406,102 B1 | 6/2002 | Arnold | |
| 6,631,796 B2 * | 10/2003 | Yanaka et al. | 192/219.4 |
| 6,702,405 B1 * | 3/2004 | Balz et al. | 303/192 |
| 2004/0011610 A1 * | 1/2004 | Witzler et al. | 188/265 |

* cited by examiner

*Primary Examiner*—Christopher P. Schwartz

(57) ABSTRACT

Disclosed is a method for operating an electromechanically operable and/or electromechanically lockable parking brake for motor vehicles having an operating element, an electronic control unit, to which are sent wheel speed values from wheel speed sensors, at least one unit for generating a brake application force, and electromechanically lockable brake devices on at least one axle, with the brake devices being adapted to be applied by the unit. Also disclosed is a parking brake for motor vehicles for implementing the method. When wheel speed values are missing, the operator decides whether a static operating mode is assigned to the parking brake, i.e. that the brakes are applied with maximum allowable force upon actuation of the operating element, and release is possible only by means of new actuation of the operating element, or decides whether a dynamic operating mode is assigned, i.e. the brake application force is exclusively developed and provided during actuation of the operating element.

7 Claims, 2 Drawing Sheets

DEVICE AND METHOD FOR OPERATING A MOTOR-VEHICLE PARKING BRAKE

BACKGROUND OF THE INVENTION

The present invention relates to a method for operating an electromechanically operable and/or electromechanically lockable parking brake for motor vehicles substantially comprising an operating element, an electronic control unit, to which are sent wheel speed values from wheel speed sensors, at least one unit for generating a brake application force, and electromechanically lockable brake devices on at least one axle, with said brake devices being adapted to be applied by the unit. The invention further relates to a parking brake for motor vehicles for implementing the method.

DE 198 34 129 C1 discloses a parking brake for motor vehicles which provides each one actuator on at least two wheel brakes applying its associated wheel brake by means of a cable pull. Further, the mentioned publication discloses a method for actuating a parking brake, according to which the application force of the actuator depends on the speed of the motor vehicle and, in addition, prevents locking of the wheels being braked by the actuator. The prior art method suffers from the disadvantage that the method cannot be implemented without wheel speed values which represent the speed of the motor vehicle and also exhibit a possible locking of the wheels being braked by the actuator.

German published patent application DE 198 36 687 A1 discloses an electronic parking brake system and a method of operation therefor. In this publication, the vehicle speed is sent as an input signal to the electronic parking brake system in order to determine the driving situation of the motor vehicle. However, when the wheel speed values of the motor vehicle wheels are not available, it is impossible to implement the method disclosed.

SUMMARY OF THE INVENTION

In view of the above, an object of the invention is to disclose a method for operating an electromechanical parking brake for motor vehicles which operates reliably in the case of missing wheel speed values or a missing vehicle speed to the end that the driving behavior of the motor vehicle remains under the control of the operator.

According to the method, this object is achieved by driving the parking brake, after its activation, in a first operating mode in the event of missing wheel speed values if the brake devices are not applied, while the parking brake is driven in a second operating mode in a contrary case.

In a favorable improvement of the method of the invention, the parking brake is driven in a first operating mode if it has been detected already in the previous operating interval that wheel speed values are missing.

Further, it is arranged for that the parking brake is driven in a first operating mode if the operator does not assign the second operating mode to the parking brake.

In a favorable improvement, the parking brake is driven in a second operating mode when the vehicle operator switches off the ignition and actuates the operating element longer than a predetermined time.

In another favorable improvement, the parking brake is driven in a second operating mode when the operator switches off the ignition and removes the ignition key from the ignition lock at least for a predetermined time.

It is arranged for in all embodiments and improvements that the application force of the parking brake in the first operating mode is developed and maintained exclusively during the actuation of the operating element, and in that a maximum admissible force is applied to the parking brake in the second operating mode upon actuation of the operating element, and release is possible only by means of a new actuation of the operating element, with the ignition switched on.

Further, the object is achieved according to the invention by the provision of a means driving the parking brake after its activation in a first operating mode in the event of missing wheel speed values if the brake devices are not applied, while the parking brake is driven in a second operating mode in a contrary case.

In addition, a warning lamp is provided informing the operator about whether the parking brake is driven in the first or the second operating mode.

BRIEF DESCRIPTION OF THE DRAWINGS

The invention will be explained in detail in the following making reference to the accompanying drawings.

In the drawings.

DETAILED DESCRIPTION OF THE DRAWINGS

Figure 1:
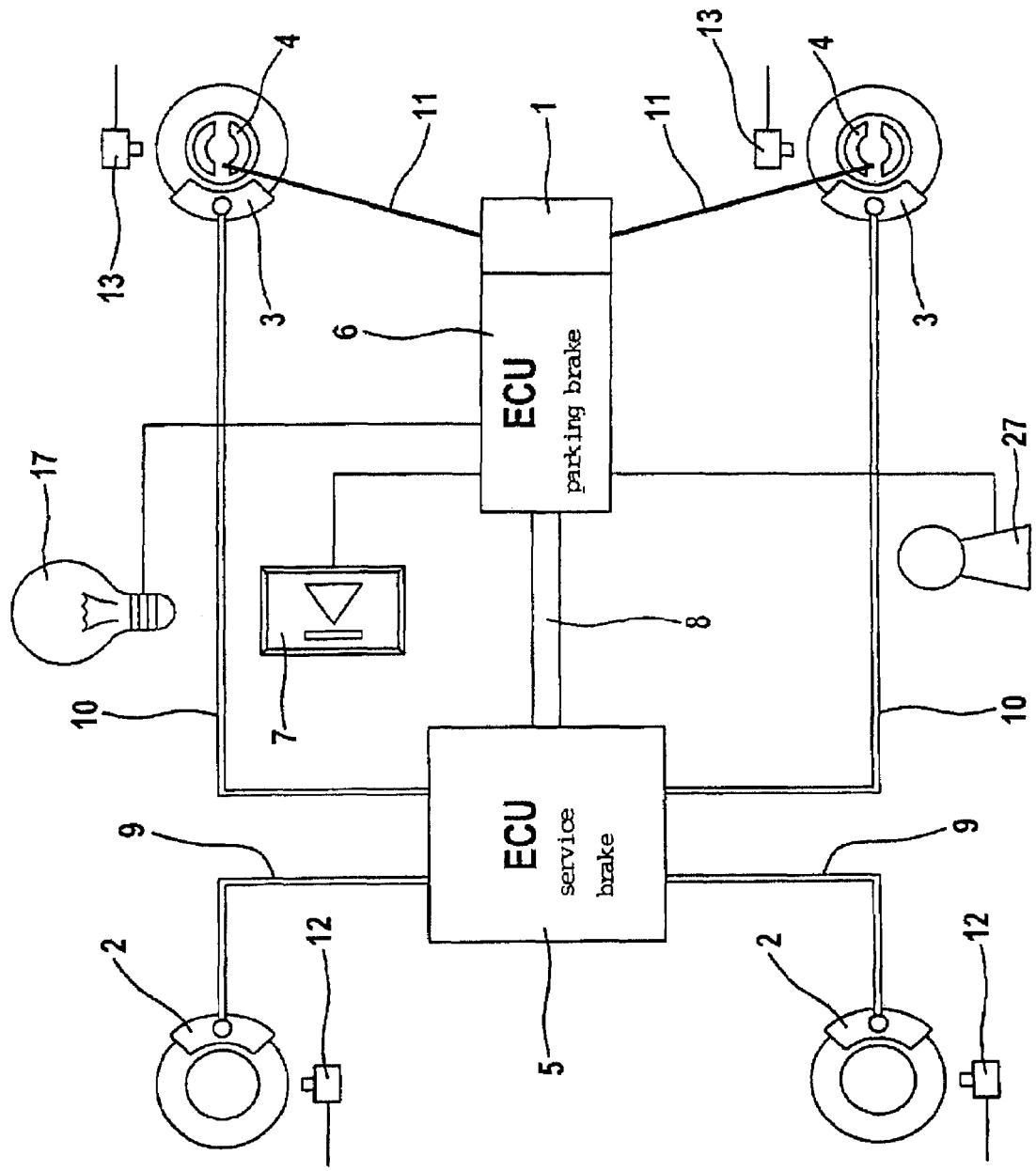
FIG. 1 is a schematic circuit diagram of a hydraulic brake system including an electromechanical adjusting unit for executing parking brake operations.

A circuit diagram of a hydraulic brake system is represented in FIG. 1. The hydraulic brake system is equipped with wheel brakes 2 on a first axle, the front axle, which can be pressurized by way of a hydraulic line 9 during service brake operations. To check the desired brake deceleration and achieve anti-lock control (ABS), wheel speed sensors 12 are associated with the wheels of the front axle whose output signals are sent to an electronic control and regulation unit (ECU) 5. This electronic control and regulation unit 5 is associated with the service brake system. On a second axle, the rear axle, there is also provision of wheel brakes 3 which can be pressurized by way of a second hydraulic line 10 during service brake operations. The wheel speeds of the wheels of the rear axle are determined by using wheel speed sensors 13 and sent to the above-mentioned electronic control and regulation unit 5. Further, the wheels of the rear axle also include an electromechanical parking brake in addition to the wheel brakes 3 for service brake operations. The electromechanical parking brake includes two mechanically locking brake devices 4 which, in the capacity of drum brakes 4, are designed with each one spreading lock (not shown). The mentioned spreading lock is operable by an electromechanical adjusting unit 1 by means of a cable pull 11, whereupon the drum brakes 4 are applied. A parking brake operation is executed after the actuation of an operating element 7 by the operator. As this occurs, the output signals of the operating element 7 are sent to an electronic control unit (ECU) 6 associated with the electromechanical parking brake, said ECU correspondingly actuating the above-mentioned electromechanical adjusting unit 1. The above-mentioned electronic control unit 6 and the electronic control and regulation unit 5 associated with the service brake system communicate with each other by way of a data line 8 that is configured as a CAN connection.

As mandated by law, drum brakes 4 must be adapted to be applied even while driving the motor vehicle, in order to provide the operator with an emergency braking function after a possible malfunction of the service brake system. In this arrangement, the electromechanical parking brake is driven in two different operating modes, a dynamic and a static operating mode. During standstill of the motor vehicle, actuation of the operating element 7 by the operator causes complete application of the drum brakes 4 by means of the electromechanical adjusting unit 1, and this brake application force is maintained. To this end, the electromechanical adjusting unit 1 has a self-locking gear (not shown). The brake application force generated can be removed only by means of a new actuation of the operating element 7, the ignition being switched on simultaneously. This brake behavior is referred to as second or as static operating mode of the electromechanical parking brake in the following. If, on the other hand, the motor vehicle is in a driving condition with a driving speed in excess of a predefined threshold of preferably 3 km/h, the drum brakes 4 are applied and the generated brake application force is maintained only as long as the operator actuates the operating element 7. As soon as the operator stops actuating the operating element 7, the motor vehicle adopts an unbraked condition again. This brake behavior of the electromechanical parking brake is referred to as first or as dynamic operating mode in the following. When the electromechanical parking brake is actuated in the dynamic operating mode, it is hence impossible to park the motor vehicle by means of the electromechanical parking brake.

To decide between static and dynamic operating mode for activating the electromechanical parking brake, the signals of the wheel speed sensors 12, 13 are monitored in the electronic control and regulation unit 5 associated with the service brake system and sent to the electronic control unit 6 associated with the parking brake. If a static operating mode is chosen erroneously when the motor vehicle is moving, complete locking of the wheels of the rear axle which results from the static operating mode can cause a behavior of the motor vehicle that is no longer controllable for the operator.

In the event of missing signals of the wheel speed sensors 12, 13 or if data line 8 is interrupted, the electronic control unit 6 associated with the parking brake is no longer furnished with wheel speed values, and upon actuation of the operating element 7 by the operator, the electronic control unit 6 is not provided with a decision criterion as to whether the parking brake shall be driven in the static or in the dynamic operating mode.

According to the method of the invention, the electromechanical parking brake is driven in the dynamic operating mode when wheel speed values are missing apart from the exceptions following hereinbelow. The operator becomes aware of this condition by means of a lamp 17 flashing constantly that is fitted in the area of the armature controls. As shown in FIG. 1, the above-mentioned lamp 17 is connected for this purpose to the electronic control unit 6 associated with the parking brake by way of a separate line in order that the information of the operator is independent of a possible failure of the data connection 8 between the two electronic control and regulation units 5, 6. A schematically illustrated ignition lock 27 is also connected by way of a separate line to the electronic control unit 6 associated with the parking brake, and information is transmitted whether the ignition key is placed in the ignition lock 27 and whether the ignition is switched on or off. The electromechanical parking brake is operated among others by switching on the ignition.

As has been mentioned before, the electromechanical parking brake is driven in the dynamic operating mode when wheel speed values are missing, unless one of the following exceptions applies. The operating mode of the electromechanical parking brake is not a dynamic one if after start of operation of the electromechanical parking brake the drum brakes 4 have been applied, i.e. if the load of the cable pulls 11 measured by a sensor (not shown) exceeds a force of 100 N. It is assumed under this condition that after start of operation, missing wheel speed values and a load of the cable pulls 11 in excess of 100 N, the motor vehicle is set operating out of the safely parked condition.

In the event of missing wheel speed values, the electromechanical parking brake is likewise not driven in the dynamic operating mode if, after start of operation of the electromechanical parking brake, no indication of missing wheel speed values has been stored in the previous operation interval in one of the two electronic control and regulation units 5, 6. In this case it is assumed for a predefined time that the motor vehicle is actually at standstill and is set to operate from the safely parked condition. When the electronic control unit 6 is still not supplied with wheel speed values upon expiry of the above-mentioned predefined time, the electromechanical parking brake is driven in the dynamic operating mode.

Further, the electromechanical parking brake is likewise not driven in the dynamic operating mode, with wheel speed values missing, when the operator selects the static operating mode. The operator makes the selection by actuating the operating element 7 after having switched off the ignition. By way of the diagram shown in FIG. 2 plotting on the abscissa the time of actuation t of the operating element 7 by the operator and on the ordinate the load of the cable pulls 11 produced by the electromechanical adjusting unit 1, it is illustrated how the operator can change from the dynamic to the static operating mode of the electromechanical parking brake.

Figure 2:
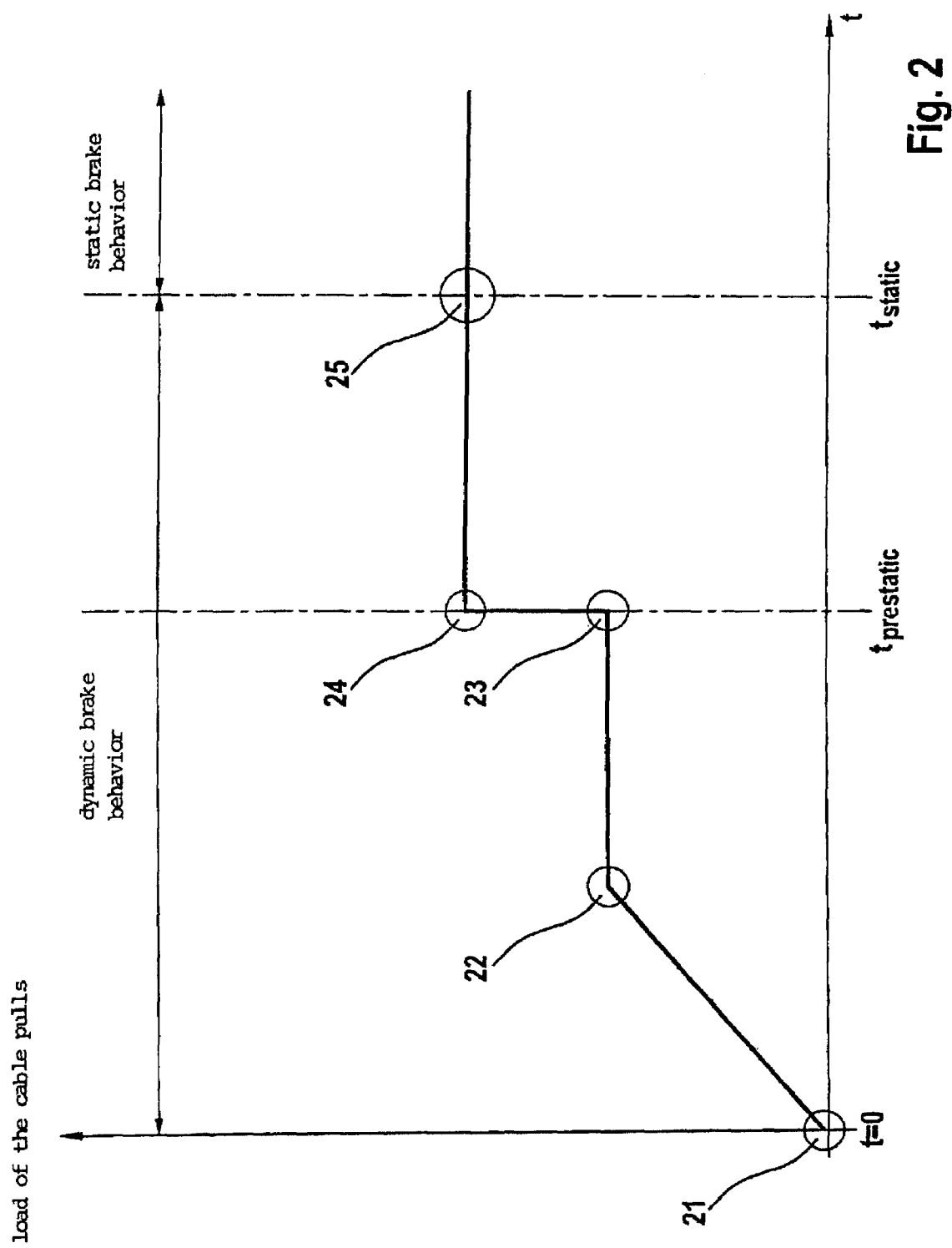
FIG. 2 shows a diagram plotting on the abscissa the actuation time of the operating element and on the ordinate the force generated by the electromechanical adjusting unit.

As shows the position 21 in FIG. 2, the load of the cable pulls 11 is almost zero before the actuation of the operating element 7. Starting from the time t=0, the operator actuates the operating element 7 continuously, and the load of the cable pulls 11 is increased by the electromechanical adjusting unit 1 linearly as a function of time until a predefined value is reached, being designated by the position 22 in FIG. 2. Subsequently, this value is maintained constant until the time $t=t_{prestatic}$ (position 23). At time $t=t_{prestatic}$, the load of the cable pulls 11 is immediately increased to the maximum admissible value, what is shown by means of the position 24 in FIG. 2. With this abrupt increase of the cable load, it is conveyed to the operator that the operating mode will change from dynamic to static when he continues actuating the operating element 7. When the operator actuates the operating element until the time $t=t_{static}$ (position 25), it is assumed that the operator wants to park the motor vehicle with the aid of the electromechanical parking brake, and the operating mode of the electromechanical parking brake changes to the static operating mode. As mentioned before, release of the drum brakes 6 is possible exclusively by a new actuation of the operating element 7 during the static operating mode. The ignition must be switched on then.

Thus, with missing wheel speed values, the electromechanical parking brake is not driven in the dynamic operating mode when the operator switches off the ignition and actuates the operating element 7 longer than a predefined period of preferably $t_{static}=10$ sec. The operator is then able to park the motor vehicle safely.

Further, the electromechanical parking brake is likewise not driven in the dynamic operating mode, with wheel speed values missing, when the operator switches off the ignition and the last wheel speed values received by the electronic control unit 6 indicate a speed of the motor vehicle of less than 10 km/h. This circumstance indicates that the operator wants to park the motor vehicle after the ignition is switched off. For this reason, the electromechanical parking brake is driven in the static operating mode when the conditions described before apply.

When wheel speed values are missing, the operating mode of the electromechanical parking brake changes from dynamic to static when the operator switches off the ignition and removes the ignition key for a time longer than a predefined time of preferably 100 msec from the ignition lock 27 mentioned with regard to FIG. 1. In a subsequent actuation of the operating element 7, the drum brakes 4 are completely applied with the aid of the electromechanical adjusting unit 1, and this brake application force is maintained. When the ignition key is introduced again into the ignition lock 27 prior to the actuation of the operating element 7, the electromechanical parking brake is driven again in the dynamic operating mode.

To inform the operator about whether the electromechanical parking brake is driven in the dynamic or the static operating mode, a warning lamp 17 is provided which is connected directly to the electronic control unit 6 associated with the electromechanical parking brake. When the dynamic operating mode is active, the warning lamp 17 is constantly flashing. When the parking brake is driven in the static operating mode and the operator actuates the operating element 7, the drum brakes 4 are completely applied by means of the electromechanical adjusting unit 1 and this brake application force is maintained, as has been mentioned hereinabove. Safe parking of the motor vehicle that is thereby rendered possible is indicated by a continuous flashing of the mentioned warning lamp.

The invention claimed is:

1. A method for operating an electromechanically operable parking brake for motor vehicles having an operating element (7), an electronic control unit (6) which receives wheel speed values from wheel speed sensors (12, 13), at least one unit (1) for generating a brake application force, and electromechanically lockable brake devices (4) on at least one axle, with said brake devices (4) being adapted to be applied by the unit (1), the method comprising:

detecting activation a parking brake by an operator;

determining if the vehicle is moving by the wheel speed values;

operating the parking brake in a first operating mode when the wheel speed values indicate that the vehicle is moving, wherein the first operating mode is a dynamic mode;

operating the parking brake in a second operation mode when the wheel speed values indicate that the vehicle is not moving, wherein the second operating mode is static mode for parking the vehicle; and operating the parking brake in the first operating mode when there are no wheel speed values detected.

2. The method according to claim 1, wherein the parking brake is driven in the first operating mode if it has been detected in the previous operating interval that the wheel speed values are missing.

3. The method according to claim 1, wherein the parking brake is driven in the first operating mode if the operator does not assign the second operating mode to the parking brake.

4. The method according to claim 1, wherein the parking brake is driven in the second operating mode when the operator switches off the ignition and actuates the operating element (7) for a time longer than a predetermined time.

5. The method according to claim 1, wherein the parking brake is driven in the second operating mode when the operator switches off the ignition and removes the ignition key from the ignition lock (27) at least for a predetermined time.

6. The method according to claim 1, wherein the brake application force of the parking brake in the first operating mode is developed and maintained exclusively during the actuation of the operating element (7), and a maximum admissible force is applied to the parking brake in the second operating mode upon actuation of the operating element (7), and release thereof is possible only by means of a new actuation of the operating element (7), with an ignition switched on.

7. The method according to claim 1, wherein a warning lamp (17) is provided to indicate to the operator whether the parking brake is driven in the first or the second operating mode.

* * * * *